(12) United States Patent
Lee et al.

(10) Patent No.: US 12,134,390 B2
(45) Date of Patent: Nov. 5, 2024

(54) METHOD AND APPARATUS FOR FUSING SENSOR INFORMATION AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Woo Young Lee, Seoul (KR); Su Min Jo, Hwaseong-si (KR); Su Min Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 370 days.

(21) Appl. No.: 17/686,972

(22) Filed: Mar. 4, 2022

(65) Prior Publication Data

US 2022/0332327 A1 Oct. 20, 2022

(30) Foreign Application Priority Data

Apr. 16, 2021 (KR) .................... 10-2021-0049879

(51) Int. Cl.
*B60W 40/105* (2012.01)
*G06F 18/25* (2023.01)

(52) U.S. Cl.
CPC .......... *B60W 40/105* (2013.01); *G06F 18/25* (2023.01); *B60W 2554/4041* (2020.02); *B60W 2554/4049* (2020.02)

(58) Field of Classification Search
CPC ....... B60W 40/105; B60W 2554/4041; B60W 2554/4049

USPC ......................................................... 701/70
See application file for complete search history.

(56) References Cited

U.S. PATENT DOCUMENTS

| | | | | |
|---|---|---|---|---|
| 6,930,593 | B2* | 8/2005 | Crawshaw | B60Q 9/008 348/148 |
| 7,333,632 | B2* | 2/2008 | Lewiner | G08G 1/054 340/936 |
| 10,486,485 | B1* | 11/2019 | Levinson | B60G 17/0162 |
| 2012/0065871 | A1* | 3/2012 | Deshpande | G08G 1/0133 701/118 |
| 2017/0185850 | A1* | 6/2017 | Hsu | G06V 10/764 |
| 2018/0151071 | A1* | 5/2018 | Park | G01S 19/40 |
| 2019/0047559 | A1* | 2/2019 | Conde | B60W 30/0956 |
| 2019/0318041 | A1* | 10/2019 | Bai | H04W 4/44 |
| 2020/0279128 | A1* | 9/2020 | Hoehne | G06F 18/2113 |
| 2021/0070311 | A1* | 3/2021 | Patychuk | B60W 50/035 |
| 2021/0181331 | A1* | 6/2021 | Zelenskiy | G01S 13/72 |
| 2021/0406547 | A1* | 12/2021 | Lee | G06V 20/40 |

(Continued)

FOREIGN PATENT DOCUMENTS

| | | | | |
|---|---|---|---|---|
| CN | 117087661 A | * | 11/2023 | ........ B60W 30/0956 |
| EP | 4184480 A2 | * | 5/2023 | ........ B60W 60/0015 |

*Primary Examiner* — Richard A Goldman
(74) *Attorney, Agent, or Firm* — Slater Matsil, LLP

(57) ABSTRACT

An embodiment sensor information fusion method includes estimating, by a host vehicle, reliability of shared sensor fusion information received from a neighboring vehicle, the shared sensor fusion information being generated by the neighboring vehicle, and generating, based on the estimated reliability, fusion track information of an object located near the host vehicle or the neighboring vehicle using host vehicle sensor fusion information generated by the host vehicle and the shared sensor fusion information.

20 Claims, 11 Drawing Sheets

(56) References Cited

U.S. PATENT DOCUMENTS

2022/0318559 A1* 10/2022 Shen ................. G06N 20/00
2023/0080491 A1* 3/2023 Buragohain ......... G06V 10/778
                                                        382/128

* cited by examiner

METHOD AND APPARATUS FOR FUSING SENSOR INFORMATION AND RECORDING MEDIUM STORING PROGRAM TO EXECUTE THE METHOD

CROSS-REFERENCE TO RELATED APPLICATIONS

This application claims the benefit of Korean Patent Application No. 10-2021-0049879, filed on Apr. 16, 2021, which application is hereby incorporated herein by reference.

TECHNICAL FIELD

Embodiments relate to a method and apparatus for fusing sensor information and to a recording medium storing a program to execute the method.

BACKGROUND

Sensor fusion technology is used for accurate vehicle location, precise positioning technology, digital mapping technology, an advanced driver assistance system (ADAS) for checking the driving state of a driver, and so on.

Sensor fusion technology is technology for fusing information sensed by a plurality of sensors mounted in a vehicle, for example, a front radio detection and ranging (radar) sensor, a front camera, and a lateral radar sensor, thereby enabling highly reliable recognition of the surrounding situation around a host vehicle. For example, with the increased autonomy of driving, sensor information fusion technology exhibiting high reliability and accuracy is required.

SUMMARY

Accordingly, embodiments are directed to a method and apparatus for fusing sensor information and to a recording medium storing a program to execute the method that may substantially obviate one or more problems due to limitations and disadvantages of the related art.

Embodiments provide a method and apparatus for fusing sensor information characterized by improved performance and a recording medium storing a program to execute the method.

However, features of the embodiments are not limited to the above-mentioned features, and other features not mentioned herein will be clearly understood by those skilled in the art from the following description.

A sensor information fusion method according to an embodiment may include estimating reliability of shared sensor fusion information received from a neighboring vehicle, the shared sensor fusion information being generated by the neighboring vehicle, and generating, based on the estimated reliability, fusion track information of an object located near at least one of a host vehicle or the neighboring vehicle using host vehicle sensor fusion information generated by the host vehicle and the shared sensor fusion information.

For example, the sensor information fusion method may further include converting the received shared sensor fusion information to a host vehicle coordinate system.

For example, the converting may include calculating the relative location and the relative speed of the neighboring vehicle with respect to the host vehicle and converting the reference location of the shared sensor fusion information into a reference location of the host vehicle using the relative location and the relative speed.

For example, the sensor information fusion method may further include inspecting whether the shared sensor fusion information and the host vehicle sensor fusion information are information about an identical object.

For example, when the shared sensor fusion information and the host vehicle sensor fusion information are information about an identical object, the reliability of the shared sensor fusion information may be estimated.

For example, the inspecting may include selecting the shared sensor fusion information as a primary candidate having information about the same object as the host vehicle sensor fusion information when a shared sensing track box belonging to the shared sensor fusion information and a host vehicle sensing track box belonging to the host vehicle sensor fusion information overlap each other.

For example, the inspecting may further include selecting a secondary candidate of the shared sensor fusion information having information about the same object as the host vehicle sensor fusion information using speed information included in the shared sensor fusion information selected as the primary candidate and speed information included in the host vehicle sensor fusion information.

For example, the inspecting may further include selecting a tertiary candidate of the shared sensor fusion information having information about the same object as the host vehicle sensor fusion information using similarity between a movement path history of the object included in the shared sensor fusion information selected as the primary candidate and a movement path history of the object included in the host vehicle sensor fusion information.

For example, the estimating the reliability may be performed using at least one of first information included in the shared sensor fusion information or second information generated using the shared sensor fusion information.

For example, the estimating the reliability may include obtaining the duration of a track included in the shared sensor fusion information, obtaining a confidence value corresponding to at least one of the location of an object sensed by the neighboring vehicle or the combination of sensors mounted in the neighboring vehicle using the shared sensor fusion information, obtaining similarity of absolute speed between the host vehicle sensor fusion information and the shared sensor fusion information, checking the order number of selections of the shared sensor fusion information as the primary candidate, the secondary candidate, and the tertiary candidate, and calculating the estimated reliability using at least one of the duration, the confidence value, the similarity of the absolute speed, or the order number of selections.

For example, when the shared sensor fusion information is not selected as any one of the primary candidate, the secondary candidate, and the tertiary candidate, a default may be assigned to the reliability.

For example, the generating the fusion track information may include forming an area in which the shared sensing track box and the host vehicle sensing track box overlap, converting the geometrical two-dimensional plane shape of the area into a rectangular shape, and determining the rectangular shape to be a fusion track box of the fusion track information.

For example, the sensor information fusion method may further include compensating for additional information of the fusion track information using the shared sensor fusion information and the host vehicle sensor fusion information.

For example, the additional information may include at least one of the type of the object, the moving direction of the object, or information indicating whether the object is in a moving state or a stationary state.

A sensor information fusion apparatus according to another embodiment may include a reliability estimator configured to receive shared sensor fusion information generated by a neighboring vehicle and to estimate reliability of the shared sensor fusion information, and a fusion information generator configured to generate, based on the estimated reliability, fusion track information of an object located near at least one of a host vehicle or the neighboring vehicle using host vehicle sensor fusion information generated by the host vehicle and the shared sensor fusion information.

For example, the sensor information fusion apparatus may further include a communicator configured to communicate with the neighboring vehicle and to receive the shared sensor fusion information, and a coordinate converter configured to convert the received shared sensor fusion information to a host vehicle coordinate system.

For example, the sensor information fusion apparatus may further include an object identicality inspector configured to inspect whether the shared sensor fusion information converted to the host vehicle coordinate system and the host vehicle sensor fusion information are information about an identical object.

For example, the sensor information fusion apparatus may further include an additional information compensator configured to compensate for additional information of the fusion track information using the shared sensor fusion information and the host vehicle sensor fusion information.

According to still another embodiment, a computer-readable recording medium in which a program for executing a sensor information fusion method is recorded may store a program to implement a function of receiving shared sensor fusion information generated by a neighboring vehicle and estimating reliability of the shared sensor fusion information and a function of generating, based on the estimated reliability, fusion track information of an object located near at least one of a host vehicle or the neighboring vehicle using host vehicle sensor fusion information generated by the host vehicle and the shared sensor fusion information.

For example, the program may further implement at least one of a function of receiving the shared sensor fusion information and converting the shared sensor fusion information to a host vehicle coordinate system, a function of inspecting whether the shared sensor fusion information and the host vehicle sensor fusion information are information about an identical object, or a function of compensating for the fusion track information using additional information included in each of the shared sensor fusion information and the host vehicle sensor fusion information.

BRIEF DESCRIPTION OF THE DRAWINGS

Arrangements and embodiments may be described in detail with reference to the following drawings, in which like reference numerals refer to like elements, and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a sensor information fusion method 100 according to an embodiment will be described with reference to the accompanying drawings. The sensor information fusion method 100 will be described using the Cartesian coordinate system (x-axis, y-axis, z-axis) for convenience of description, but may also be described using other coordinate systems.

Figure 1:
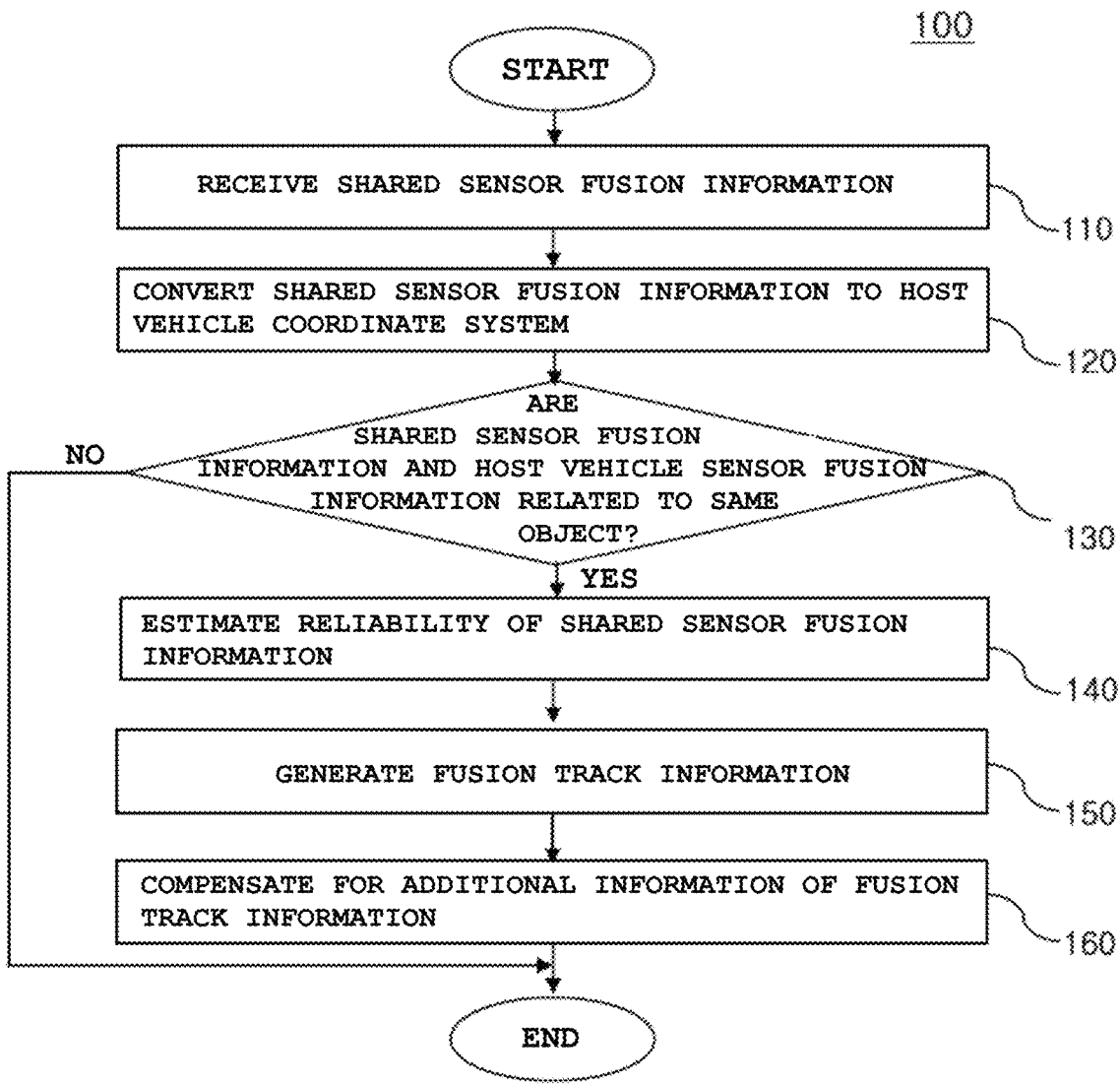
FIG. 1 is a flowchart showing a sensor information fusion method according to an embodiment.
Figure 2:
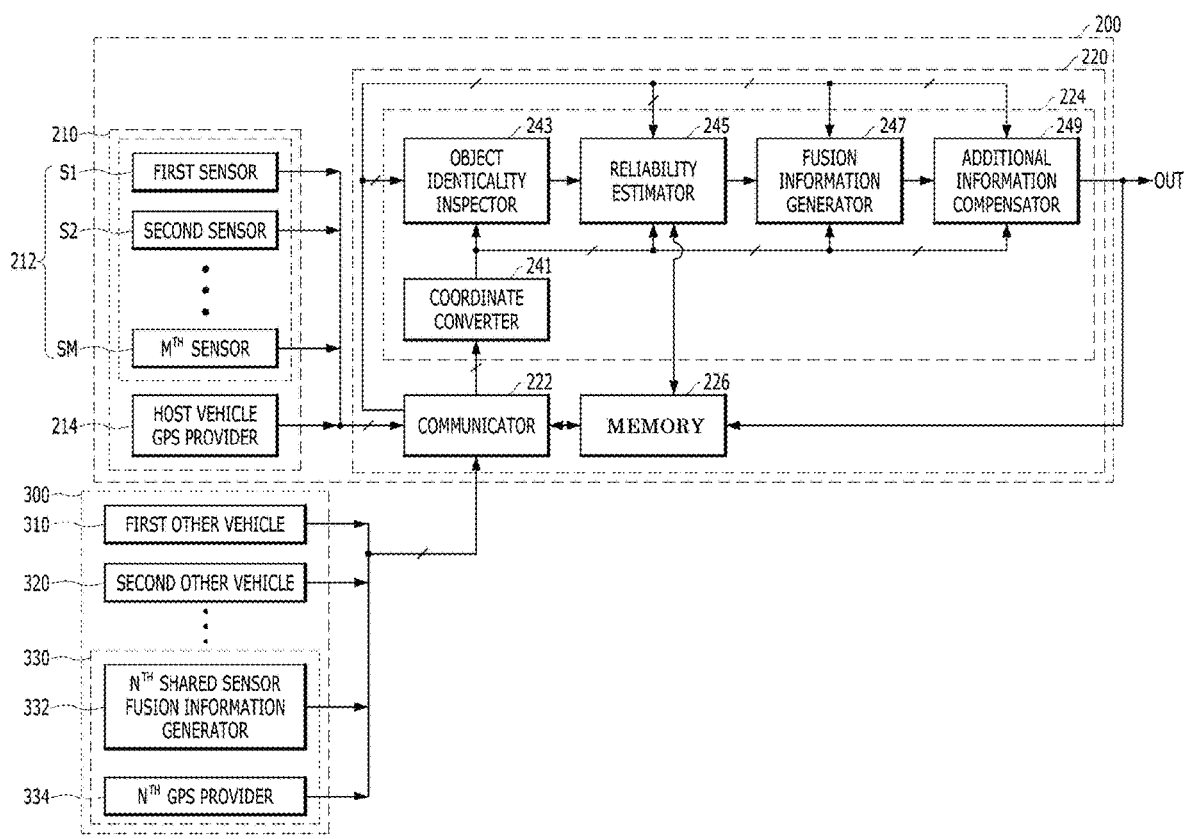
FIG. 2 is a block diagram of a vehicle according to an embodiment.

FIG. 1 is a flowchart showing a sensor information fusion method 100 according to an embodiment, and FIG. 2 is a block diagram of a vehicle 200 according to an embodiment.

The vehicle 200 (hereinafter referred to as a "host vehicle") shown in FIG. 2 may include a host vehicle information acquisition unit 210 and a sensor information fusion apparatus 220.

Prior to describing the sensor information fusion method 100 shown in FIG. 1, the configuration and operation of the vehicle 200 shown in FIG. 2 will now be described.

The host vehicle information acquisition unit 210 mounted in the host vehicle 200 may serve to acquire a variety of pieces of information, and may include a sensing unit 212 and a host vehicle GPS provider 214.

The sensing unit 212 may include one or more sensors configured to detect obstacles located near the vehicle 200, for example, a preceding vehicle, and to measure the distance to the detected obstacle and/or the relative speed thereof.

The sensing unit 212 may include first to $M^{th}$ sensors S1, S2, ... and SM in order to detect objects present outside the vehicle 200, and may acquire information about the location of an object, the speed of an object, the moving direction of an object, and/or the type of an object (e.g. a vehicle, a pedestrian, a bicycle, or a motorcycle). Here, M is a positive integer of 1 or more.

Each of the first to $M^{th}$ sensors S1, S2, . . . and SM may include an ultrasonic sensor, a radio detection and ranging (radar) sensor, a camera, a laser scanner and/or corner radar, a light detection and ranging (LiDAR) sensor, an acceleration sensor, a yaw rate sensor, a torque measurement sensor, a wheel speed sensor, a steering angle sensor, and/or the like.

The sensor information fusion apparatus 220 according to the embodiment may be provided inside the vehicle 200. In this case, the sensor information fusion apparatus 220 may be integrally formed with internal control units (not shown) of the vehicle 200, or may be provided separately and may be connected to the control units of the vehicle 200 via separate connection means.

The sensor information fusion apparatus 220 may be implemented in the form of an independent hardware device including memory and a processor for processing operations. Alternatively, the apparatus 220 may be driven in the form of being included in another hardware device such as a microprocessor or a general-purpose computer system.

For example, the sensor information fusion apparatus 220 may include a communicator 222 and a processor 224.

The communicator 222 may be a hardware device implemented with various electronic circuits to transmit and receive a signal through a wireless or wired connection, and may perform V2X (e.g. V2V or V2I) communication with an external server outside the vehicle, an infrastructure element, or another vehicle (or a "neighboring vehicle") 300 using an in-vehicle network communication technology, a wireless communication technology, or a short-range communication technology. Here, examples of the in-vehicle network communication technology may include controller area network (CAN) communication, local interconnect network (LIN) communication, and flex-ray communication, and may enable in-vehicle communication. Examples of the wireless communication technology, also known as a wireless Internet technology, may include wireless LAN (WLAN), wireless broadband (WiBro), Wi-Fi, and world interoperability for microwave access (WiMAX). Examples of the short-range communication technology may include Bluetooth, ZigBee, ultra wideband (UWB), radio frequency identification (RFID), and infrared data association (IrDA).

The communicator 222 may receive results of sensing from the sensors S1 to SM included in the sensing unit 212 mounted in the host vehicle 200. The results of sensing received by the communicator 222 may include sensor fusion information (hereinafter referred to as "host vehicle sensor fusion information") acquired by sensing an object.

The other vehicle 300 shown in FIG. 2 may include first to $N^{th}$ other vehicles 310, 320, . . . and 330. Here, N is a positive integer of 1 or more. Each of the first to $N^{th}$ other vehicles 310 to 330 (i.e. the $n^{th}$ other vehicle) may include an $n^{th}$ shared sensor fusion information generator and an $n^{th}$ GPS provider. That is, as shown in FIG. 2, the $N^{th}$ other vehicle 330 may include an $N^{th}$ shared sensor fusion information generator 332 and an $N^{th}$ GPS provider 334.

The $n^{th}$ shared sensor fusion information generator 332 generates sensor fusion information (hereinafter referred to as "shared sensor fusion information"), which is a result of sensing an object by a sensing unit (not shown) mounted in the $n^{th}$ other vehicle. The sensing unit mounted in the $n^{th}$ other vehicle may include one or more sensors S1 to SM, similar to the sensing unit 212 mounted in the host vehicle 200. The $n^{th}$ GPS provider 334 may provide GPS information about the location and speed of the $n^{th}$ vehicle.

In addition, the sensor information fusion apparatus 220 may further include a memory, i.e., a storage, 226. The memory 226 may store a result of sensing by the sensing unit 212, data acquired by the processor 224, and data and/or an algorithm required for operation of the processor 224.

In one example, the memory 226 may store sensing information acquired by sensors, such as a camera, a LiDAR sensor, and a radar sensor, mounted in the host vehicle 200 or the other vehicle 300, and may include a lookup table (LUT), which will be described later.

The memory 226 may include at least one storage medium selected from among a flash-memory-type memory, a hard-disk-type memory, a micro-type memory, a card-type (e.g. a secure digital (SD) card or an extreme digital (XD) card) memory, a random access memory (RAM), a static RAM (SRAM), a read-only memory (ROM), a programmable ROM (PROM), an electrically erasable PROM (EEPROM), a magnetic RAM (MRAM), a magnetic-disk-type memory, and an optical-disk-type memory.

In addition, although not shown, the sensor information fusion apparatus 220 may further include an interface.

The interface may include an input interface for receiving a control command from a user and an output interface for outputting the operational state of the vehicle 200 and the result thereof. Here, the input interface may include a key button, and may further include a mouse, a joystick, a jog shuttle, a stylus pen, and the like. In addition, the input interface may include a soft key implemented on a display.

The output interface may include a display and an audio output unit such as a speaker. In this case, when the display is provided with a touch sensor, such as a touch film, a touch sheet, or a touch pad, the display may be implemented as a touch screen, and the input interface and the output interface may be implemented in an integrated form. In one example, the output interface may output information sensed by the sensing unit 212, or may output sensor information fused by the sensor information fusion apparatus 220.

In this case, the display may include at least one of a liquid crystal display (LCD), a thin-film-transistor liquid crystal display (TFT LCD), an organic light-emitting diode (OLED), a flexible display, a field emission display (FED), or a three-dimensional (3D) display.

The processor 224 may be electrically connected to the communicator 222, the memory 226, and the interface, and may electrically control respective components. The processor 224 may be an electric circuit that executes software instructions, and thus may perform various data processing operations and calculations to be described later. The processor 224 may be, for example, an electronic control unit (ECU), a micro control unit (MCU), or another low-level controller, mounted in the host vehicle 200.

Meanwhile, although the sensor information fusion method 100 shown in FIG. 1 will be described as being performed by the sensor information fusion apparatus 220 shown in FIG. 2 for convenience of description, the embodiments are not limited thereto. That is, according to another embodiment, the sensor information fusion method 100 shown in FIG. 1 may be performed by a sensor information fusion apparatus configured differently from the sensor information fusion apparatus 220 shown in FIG. 2. In addition, although the sensor information fusion apparatus 220 shown in FIG. 2 will be described as performing the sensor information fusion method 100 shown in FIG. 1, the embodiments are not limited thereto. That is, according to another embodiment, the sensor information fusion apparatus 220 shown in FIG. 2 may perform a sensor information fusion method configured differently from the sensor information fusion method 100 shown in FIG. 1.

Referring again to FIG. 1, the sensor information fusion method 100 according to the embodiment may include a step of receiving shared sensor fusion information generated by the other vehicle 300 and transmitted therefrom (step 110). To this end, the communicator 222 shown in FIG. 2 may communicate with each of the first to $N^{th}$ other vehicles 310 to 330, and may receive shared sensor fusion information generated by each of the first to $N^{th}$ other vehicles 310 to 330.

Although steps 120 to 160 of the sensor information fusion method 100 shown in FIG. 1 will be described as being performed by the processor 224 of the sensor information fusion apparatus 220 shown in FIG. 2 for convenience of description, the embodiments are not limited thereto. That is, according to another embodiment, steps 120 to 160 shown in FIG. 1 may be performed by a separate block, other than the processor 224. That is, according to another embodiment, in order to perform steps 120 to 160 shown in FIG. 1, the sensor information fusion apparatus 220 may include a coordinate converter 241, an object identicality inspector 243, a reliability estimator 245, a fusion information generator 247, and an additional information compensator 249.

After step 110, the received shared sensor fusion information is converted to a host vehicle coordinate system (step 120). To this end, the coordinate converter 241 may convert the shared sensor fusion information received by the communicator 222 to the host vehicle coordinate system, and may output the converted shared sensor fusion information to at least one of the object identicality inspector 243, the reliability estimator 245, the fusion information generator 247, or the additional information compensator 249.

Figure 3:
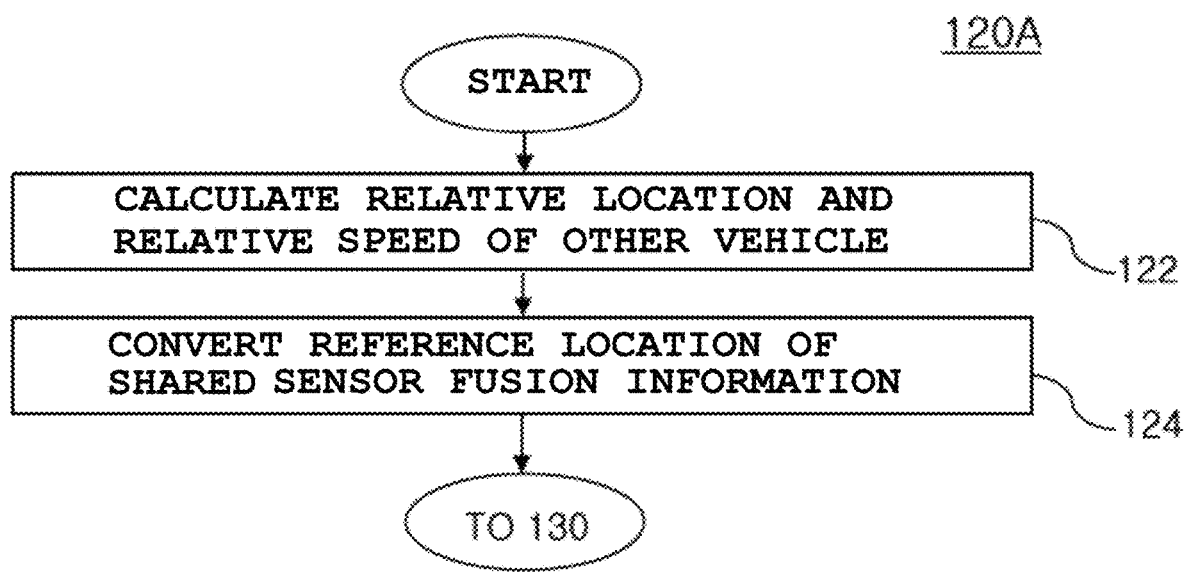
FIG. 3 is a flowchart showing an embodiment of step 120 shown in FIG. 1.

FIG. 3 is a flowchart showing an embodiment 120A of step 120 shown in FIG. 1.

After step 11o, the relative location and the relative speed of the other vehicle 300 with respect to the host vehicle 200 are calculated (step 122). To this end, the communicator 222 may receive GPS information, including information about the location and speed of the host vehicle 200, from the host vehicle GPS provider 214, and may output the received GPS information to the coordinate converter 241. In addition, the communicator 222 may receive GPS information, including information about the location and speed of each of the first to $N^{th}$ other vehicles 310 to 330, from the $n^{th}$ GPS provider (e.g. 334) of each of the first to $N^{th}$ other vehicles 310 to 330, and may output the received GPS information to the coordinate converter 241. Thereafter, the coordinate converter 241 calculates the relative location and the relative speed of the other vehicle 300 with respect to the host vehicle 200 using the GPS information of the host vehicle and the GPS information of the other vehicle.

After step 122, the reference location of the shared sensor fusion information is converted into the reference location of the host vehicle 200 using the relative location and the relative speed (step 124). To this end, the coordinate converter 241 may use the relative location and the relative speed of the other vehicle 300 with respect to the host vehicle 200 to convert the reference location of the shared sensor fusion information received by the communicator 222 into the reference location of the host vehicle 200.

Referring again to FIG. 1, after step 120, whether the shared sensor fusion information and the host vehicle sensor fusion information are information about the same object is inspected (step 130). To this end, the object identicality inspector 243 may receive the shared sensor fusion information converted to the host vehicle coordinate system by the coordinate converter 241 and the host vehicle sensor fusion information provided from the communicator 222, may inspect whether the shared sensor fusion information and the host vehicle sensor fusion information are information about the same object, and may output the result of the inspection to the reliability estimator 246.

Figure 4A:
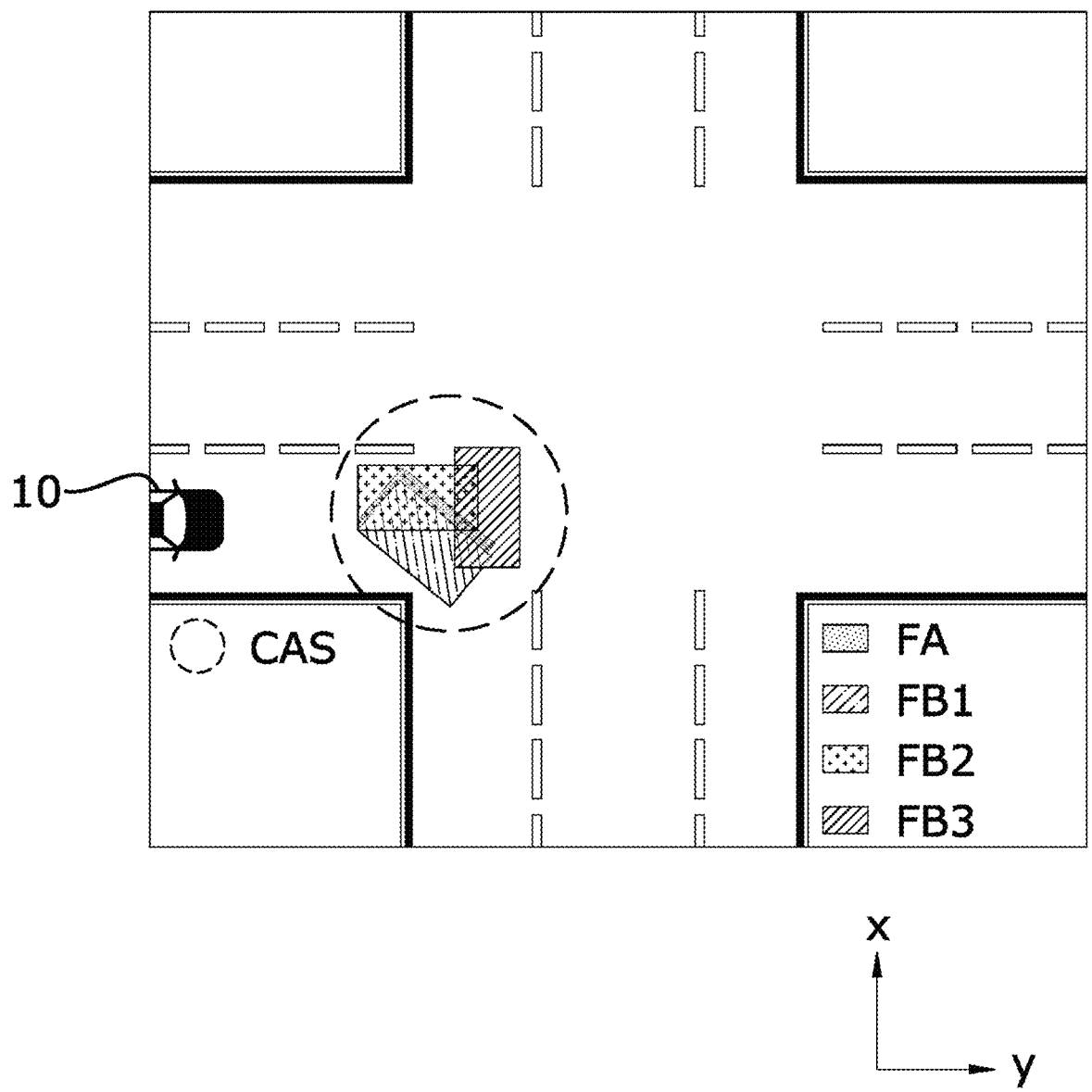
FIGS. 4A to 4C are diagrams for helping understand step 130 shown in FIG. 1.
Figure 4B:
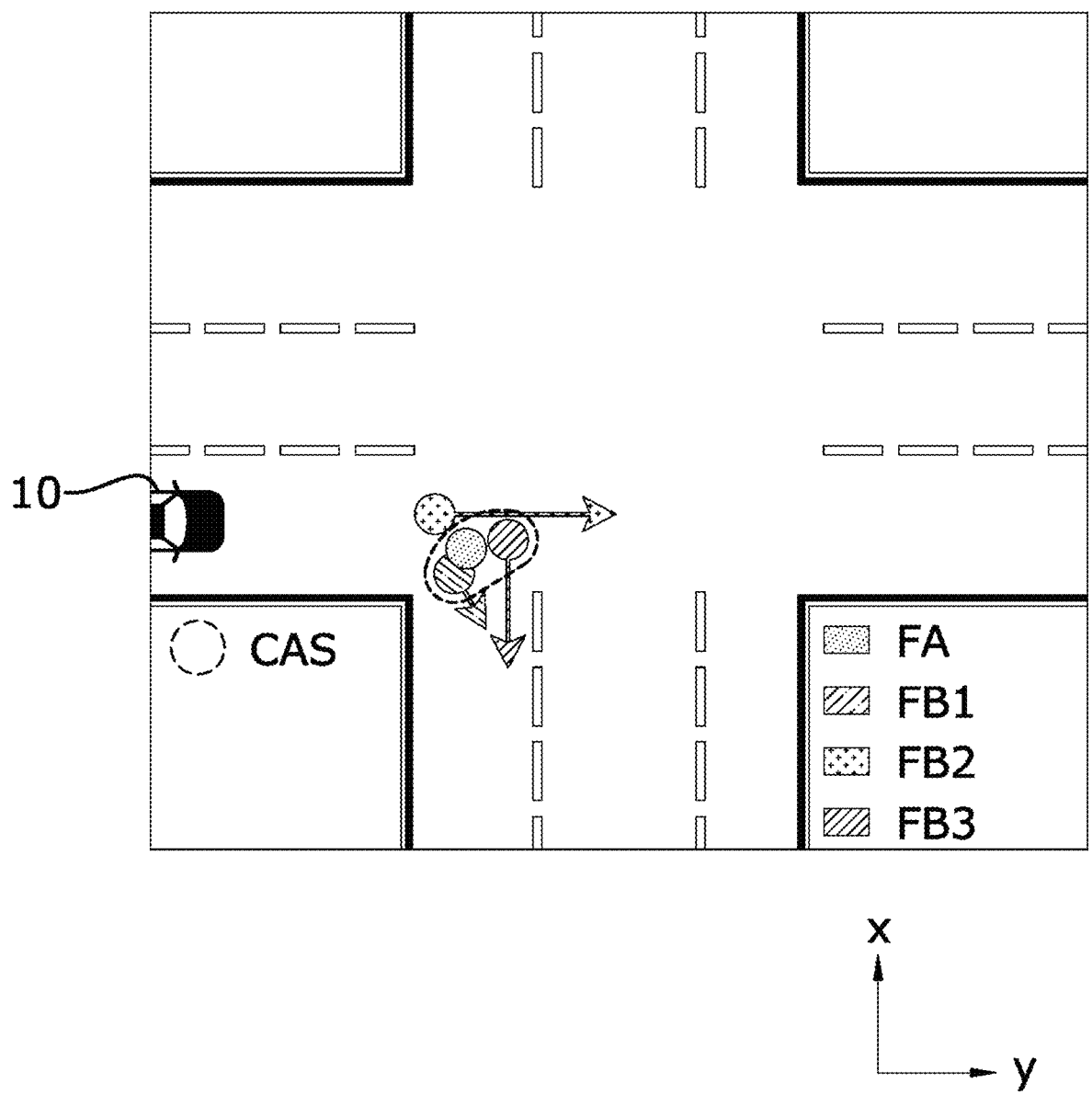
Figure 4C:
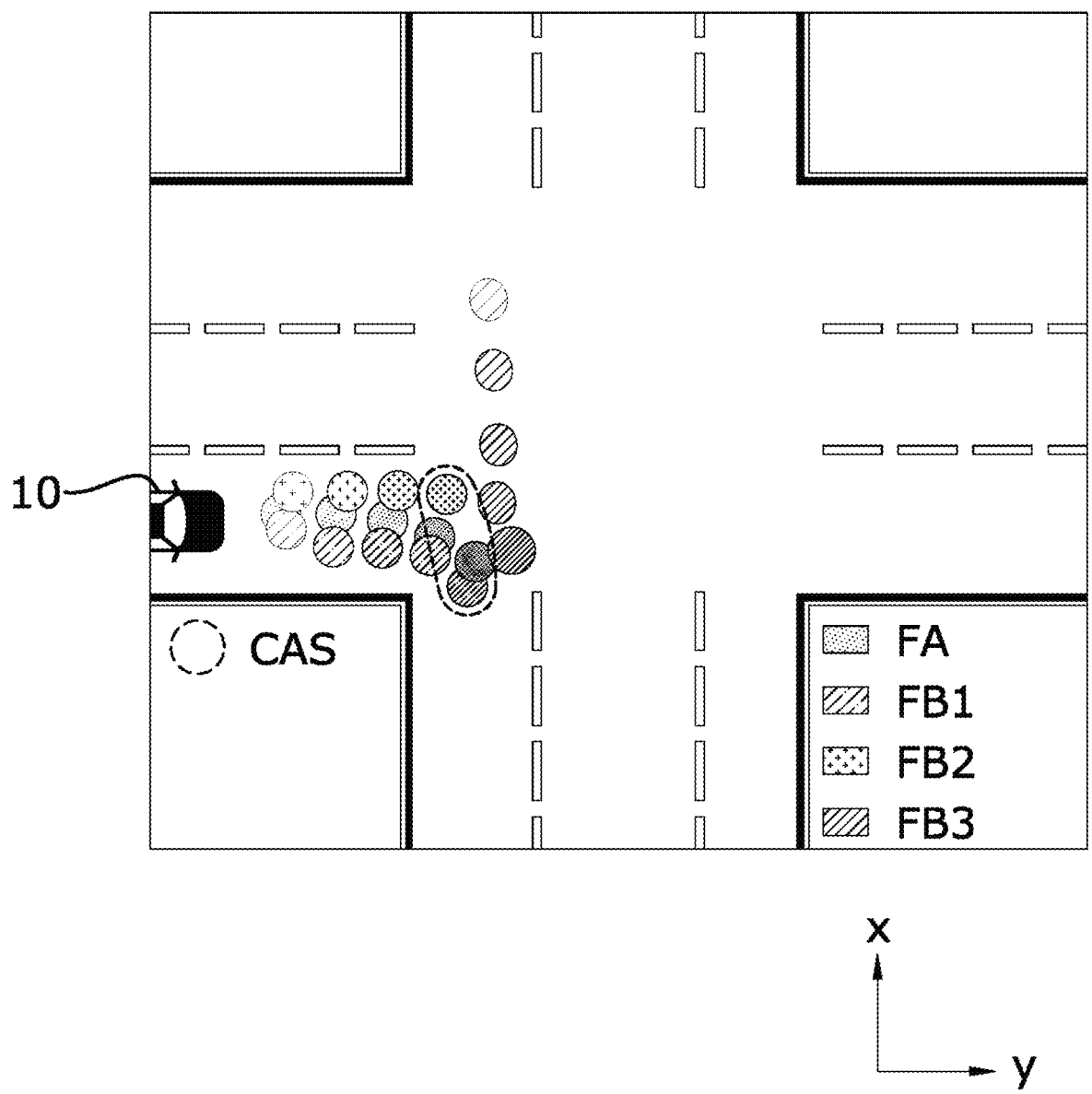

FIGS. 4A to 4C are diagrams for helping understand step 130 shown in FIG. 1, wherein CAS represents shared sensor fusion information selected as a candidate, reference numeral "10" represents the host vehicle 200, FA represents the host vehicle sensor fusion information, and FB1, FB2 and FB3 respectively represent first to third pieces of shared sensor fusion information.

For better understanding, in FIGS. 4A to 4C, it is assumed that the first to third pieces of shared sensor fusion information are received by the communicator 222 and converted to the host vehicle coordinate system by the coordinate converter 241. However, the following description may also apply to the case in which the number of pieces of shared sensor fusion information is two, or is four or more. For example, the first to third pieces of shared sensor fusion information may be generated in at least one of the first to $N^{th}$ other vehicles 310 to 330.

In order to perform step 130, whether a sensing track box capable of being obtained from each of the first to third pieces of shared sensor fusion information FB1, FB2 and FB3 (hereinafter referred to as a "shared sensing track box") and a sensing track box capable of being obtained from the host vehicle sensor fusion information FA (hereinafter referred to as a "host vehicle sensing track box") overlap each other is inspected. Here, each of the shared sensing track box and the host vehicle sensing track box may include information about a heading, width, and length of the sensed object.

In the case in which the definitions of the output reference point and the heading angle are different for each vehicle, it may be difficult to determine whether the shared sensor fusion information and the host vehicle sensor fusion information are information about the same object in a point-to-point matching manner. Further, because the output reference point varies for each vehicle, it may be different to inspect whether the shared sensor fusion information and the host vehicle sensor fusion information are information about the same object. For example, the output reference point of a vehicle may be the center point of the rear bumper of the vehicle, the center point of an object, or the point closest to the host vehicle. However, the above problems may be solved by inspecting whether the shared sensing track box and the host vehicle sensing track box overlap each other.

The shared sensor fusion information having the shared sensing track box overlapping the host vehicle sensing track box is selected as a primary candidate having information about the same object as the host vehicle sensor fusion information. For example, as shown in FIG. 4A, when the shared sensing track box of each of the first to third pieces of shared sensor fusion information FB1, FB2 and FB3 overlaps the host vehicle sensing track box, all of the first to third pieces of shared sensor fusion information FB1, FB2 and FB3 may be selected as primary candidates.

Thereafter, in step 130, the speed information included in the shared sensor fusion information selected as the primary candidate and the speed information included in the host vehicle sensor fusion information may be used to select shared sensor fusion information having information about the same object as the host vehicle sensor fusion information as a secondary candidate. For example, shared sensor fusion information satisfying the conditions shown in Equation 1 below may be selected as the secondary candidate.

$$V_{xA} - V_{xB} < V_{xT} \text{ and } V_{yA} - V_{yB} < V_{yT} \quad \text{Equation 1}$$

Here, $V_{xA}$ represents the speed in the x-axis direction included in the host vehicle sensor fusion information, $V_{yA}$ represents the speed in the y-axis direction included in the host vehicle sensor fusion information, $V_{xB}$ represents the speed in the x-axis direction included in each piece of shared sensor fusion information selected as the primary candidate, $V_{yB}$ represents the speed in the y-axis direction included in each piece of shared sensor fusion information selected as the primary candidate, $V_{xT}$ represents the threshold value of the speed in the x-axis direction, and $V_{yT}$ represents the threshold value of the speed in the y-axis direction. For example, the arrows shown in FIG. 4B indicate the directions of progression of the first to third pieces of shared sensor fusion information FB1, FB2 and FB3 selected as the primary candidate.

Thereafter, in step 130, similarity between the movement path history of the object included in the shared sensor fusion information selected as the primary candidate and the movement path history of the object included in the host vehicle sensor fusion information is inspected, and shared sensor fusion information having information about the same object as the host vehicle sensor fusion information is selected as a tertiary candidate using the result of inspection. For example, referring to FIG. 4C, the movement path history of the object included in the first and second shared sensor fusion information FB1 and FB2 is similar to the movement path history of the object included in the host vehicle sensor fusion information FA, but the movement path history of the object included in the third shared sensor fusion information FB3 is not similar to the movement path history of the object included in the host vehicle sensor fusion information FA. Accordingly, the first and second shared sensor fusion information FB1 and FB2 may be selected as the tertiary candidate.

According to an embodiment, only the shared sensor fusion information selected simultaneously as the primary to tertiary candidates may be determined to be information about the same object as the host vehicle sensor fusion information.

According to another embodiment, the shared sensor fusion information selected as the primary and secondary candidates, rather than the tertiary candidate, may also be determined to be information about the same object as the host vehicle sensor fusion information.

According to still another embodiment, the shared sensor fusion information selected as the primary and tertiary candidates, rather than the secondary candidate, may also be determined to be information about the same object as the host vehicle sensor fusion information.

Referring again to FIG. 1, the reliability of the shared sensor fusion information generated by the other vehicle 300 is estimated (step 140). To this end, the reliability estimator 245 may estimate the reliability of the shared sensor fusion information having the coordinates resulting from the conversion by the coordinate converter 241, and may output the estimated reliability to the fusion information generator 247. In order to perform this operation, the reliability estimator 245 may receive the host vehicle sensor fusion information via the communicator 222, may receive the shared sensor fusion information from the coordinate converter 241, and may receive the result of inspection by the object identicality inspector 243.

According to an embodiment, as shown in FIG. 1, step 140 may be performed only when the shared sensor fusion information and the host vehicle sensor fusion information are determined to be information about the same object.

According to another embodiment, unlike what is illustrated in FIG. 1, step 140 may also be performed when the shared sensor fusion information and the host vehicle sensor fusion information are determined not to be information about the same object.

If step 140 is performed as shown in FIG. 1, steps 140 to 160 are not performed on the shared sensor fusion information that is not information about the same object as the host vehicle sensor fusion information, thereby making it possible to shorten the time taken to perform the sensor information fusion method 100 according to the embodiment.

Figure 5:
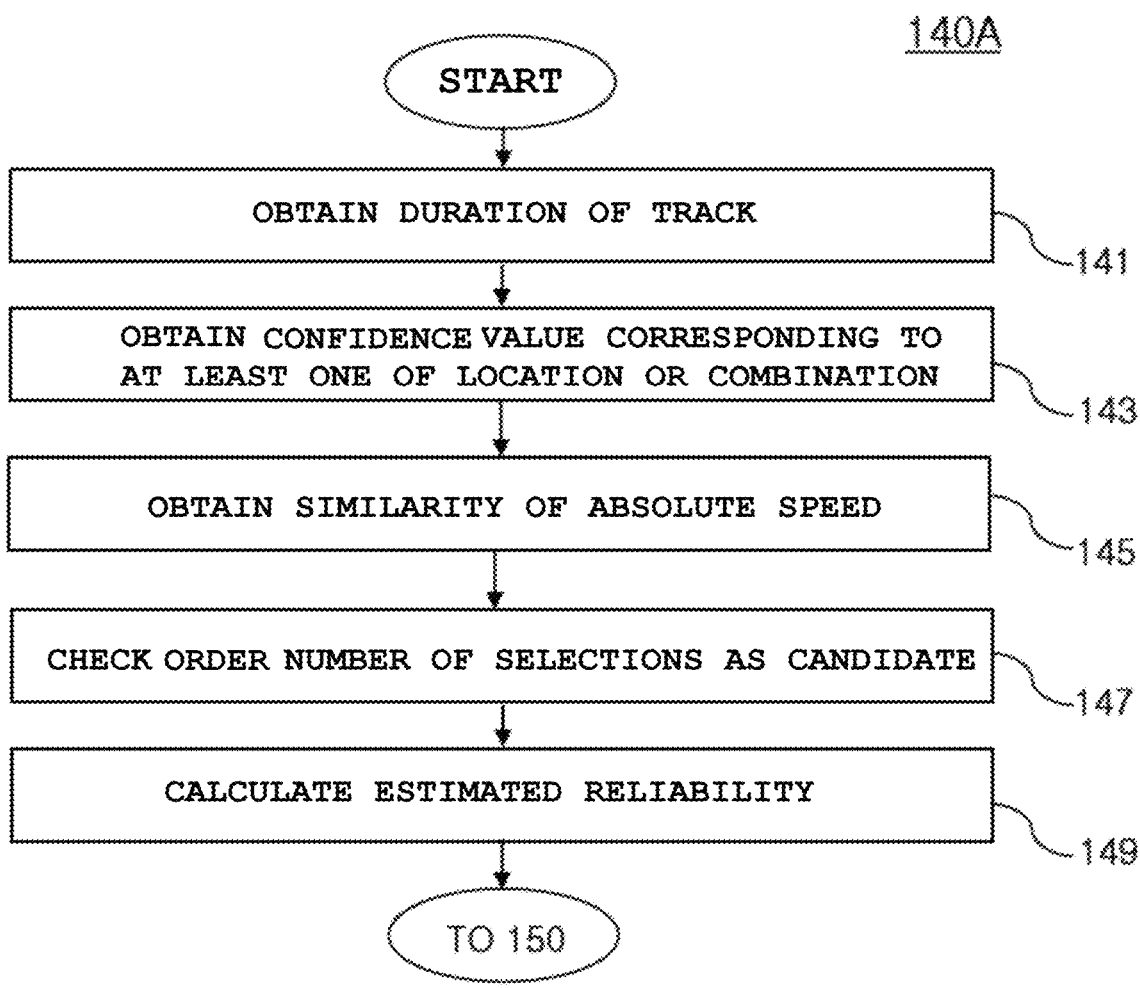
FIG. 5 is a flowchart showing an embodiment of step 140 shown in FIG. 1.

FIG. 5 is a flowchart showing an embodiment 140A of step 140 shown in FIG. 1.

The duration of a track included in the shared sensor fusion information may be obtained (step 141). Here, the duration of the track may be information included in the shared sensor fusion information. The longer the track lasts, the greater the probability of existence of an object, thus improving reliability.

After step 141, a confidence value corresponding to at least one of the location of an object sensed by the other vehicle 300 or a combination of the sensors mounted in the other vehicle 300 may be obtained (step 143). The confidence value corresponding to at least one of the location of an object sensed by the other vehicle 300 or a combination of the sensors mounted in the other vehicle 300 may be set in advance experimentally, and may be stored in the lookup table (LUT). At least one of the location of an object sensed by the other vehicle 300 or a combination of the sensors mounted in the other vehicle 300 may be obtained using the shared sensor fusion information.

The greater the number of sensors involved in fusion, the greater the reliability of the information. However, a combination of specific sensors may instead deteriorate reliability depending on the location of an object. Therefore, reliability may be evaluated in consideration of the location of an object and the combination of sensors sensing the object.

In the case in which the shared sensor fusion information is acquired by the other vehicle 300 by fusing the results of sensing by "K" sensors, the confidence value corresponding to the combination of the "K" sensors and the location of the object may be expressed using Equation 2 below, and may be stored in the lookup table (LUT).

$$\sum_{k=0}^{K} LUT_p(S_k) \quad \text{Equation 2}$$

Equation 2 represents a confidence value, which is obtained when an object is located a distance pm away from the host vehicle 200 and "K" sensors are combined, and which is stored in the lookup table (LUT).

For example, it is assumed that the field of view (FOV) of the front radar sensor mounted in the other vehicle 300 is 180 m, that the FOV of the front camera mounted in the other vehicle 300 is 90 m, and that the FOV of the lateral radar sensor mounted in the other vehicle 300 is 80 m. In this case, when it is recognized from the result of analyzing the shared sensor fusion information that the object sensed by the other vehicle 300 is located 80 m away from the host vehicle, the confidence value in the case of acquiring the shared sensor fusion information through the combination of the front radar sensor and the front camera or the combination of the front radar sensor and the lateral radar sensor is greater than the confidence value in the case of acquiring the shared sensor fusion information through the combination of the front camera and the lateral radar sensor. These confidence values may be set in advance experimentally, and may be stored in the lookup table (LUT).

After step 143, similarity of the absolute speed between the host vehicle sensor fusion information and the shared sensor fusion information is obtained (step 145). Since speed is information that can be measured by a radar sensor using the Doppler effect of radio waves, reliability may be estimated by inspecting the similarity of the absolute speed between the host vehicle sensor fusion information and the shared sensor fusion information. Since most vehicles having a smart cruise control (SCC) function are equipped with a radar sensor and thus are capable of measuring speed, the reliability estimator 245 may perform step 145.

After step 145, the order number of times that the shared sensor fusion information has been selected as the primary candidate, the secondary candidate, and the tertiary candidate is checked (step 147). For example, the greater the number of times that the shared sensor fusion information is selected as the primary candidate, the secondary candidate, and the tertiary candidate, the greater the reliability of the shared sensor fusion information.

Although it is illustrated in FIG. 5 that steps 141 to 147 are sequentially performed in that order, the embodiments are not limited thereto. That is, steps 141 to 147 may be performed in any order.

After step 147, the estimated reliability is calculated using at least one of the duration, the confidence value, the similarity of the absolute speed, or the order number of selections as the candidate (step 149). For example, the reliability of the shared sensor fusion information may be calculated using Equation 3 below.

$$RL = \alpha \times \text{count} + \beta \times \sum_{k=0}^{K} LUT_p(S_k) + \gamma \times VS(FA, FBi) + \delta \times TN \quad \text{Equation 3}$$

Here, RL represents the estimated reliability, count represents the duration, and VS(FA, FBi) represents the similarity of the absolute speed between the host vehicle sensor fusion information FA and the $i^{th}$ shared sensor fusion information. For example, as shown in FIGS. 4A to 4C, when the number of pieces of shared sensor fusion information is three, i has a value of 1, 2 or 3. TN represents the order number of selections as the candidate. The reliability of shared sensor fusion information that has been selected as the candidate more than once, for example, the shared sensor fusion information selected as the primary and secondary candidates (TN=2), the shared sensor fusion information selected as the primary and tertiary candidates (TN=2), or the shared sensor fusion information selected as the primary to tertiary candidates (TN=3), is greater than the reliability of shared sensor fusion information that has been selected as only one of the primary to tertiary candidates (TN=1). α, β, γ and δ respectively represent the coefficients of the duration, the confidence value, the similarity of the absolute speed, and the order number of selections as the candidate for estimating the reliability RL.

Unlike what is illustrated in FIG. 1, when step 140 is performed even when the shared sensor fusion information and the host vehicle sensor fusion information are not information about the same object, that is, when the shared sensor fusion information has not been selected as any one of the primary candidate, the secondary candidate, and the tertiary candidate, the order number of selections as the candidate identified in step 147, i.e. TN in Equation 3, may be taken as a default.

Also, the reliability of the shared sensor fusion information may be estimated using at least one of first information included in the shared sensor fusion information or second information generated using the shared sensor fusion information. Here, the first information may correspond to the duration of the track described above, and the second information may correspond to at least one of the confidence value, the similarity of the absolute speed, or the order number or times of selection as the candidate described above.

Referring again to FIG. 1, after step 140, based on the estimated reliability, fusion track information of an object located near at least one of the host vehicle or the other vehicle is generated using the host vehicle sensor fusion information and the shared sensor fusion information (step 150). To this end, the fusion information generator 247 generates, based on the estimated reliability received from the reliability estimator 245, fusion track information of an object located near at least one of the host vehicle 200 or the other vehicle 300 using the host vehicle sensor fusion information generated by the host vehicle 200 and the shared sensor fusion information generated by the other vehicle 300, and outputs the generated fusion track information. To this end, the host vehicle sensor fusion information may be provided from the communicator 222 to the fusion information generator 247, and the shared sensor fusion information may be provided from the coordinate converter 241 to the fusion information generator 247.

For example, the shape of an object may be estimated to be a rectangular box shape, and the fusion track information thereof may be generated using the shared sensor fusion information and the host vehicle sensor fusion information, which are estimated to have reliability greater than or equal to a threshold value. In this case, the location of the rectangular box may correspond to the location of the object having the estimated shape, and the size of the rectangular box, i.e. the width and the length thereof, may correspond to the width and the length of the object having the estimated shape, respectively.

Figure 6:
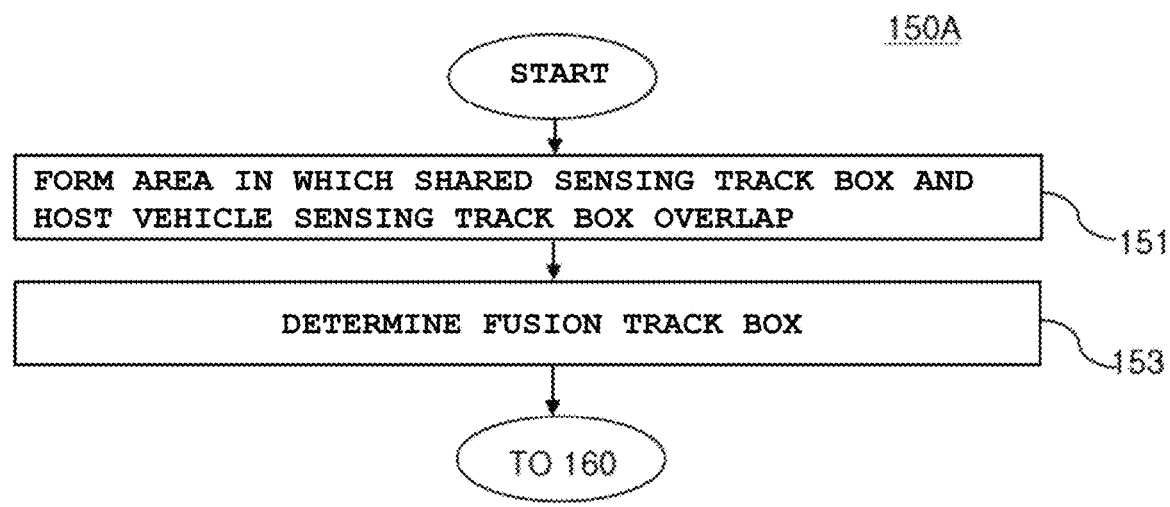
FIG. 6 is a flowchart showing an embodiment of step 150 shown in FIG. 1.

FIG. 6 is a flowchart showing an embodiment 150A of step 150 shown in FIG. 1.

Figure 7:
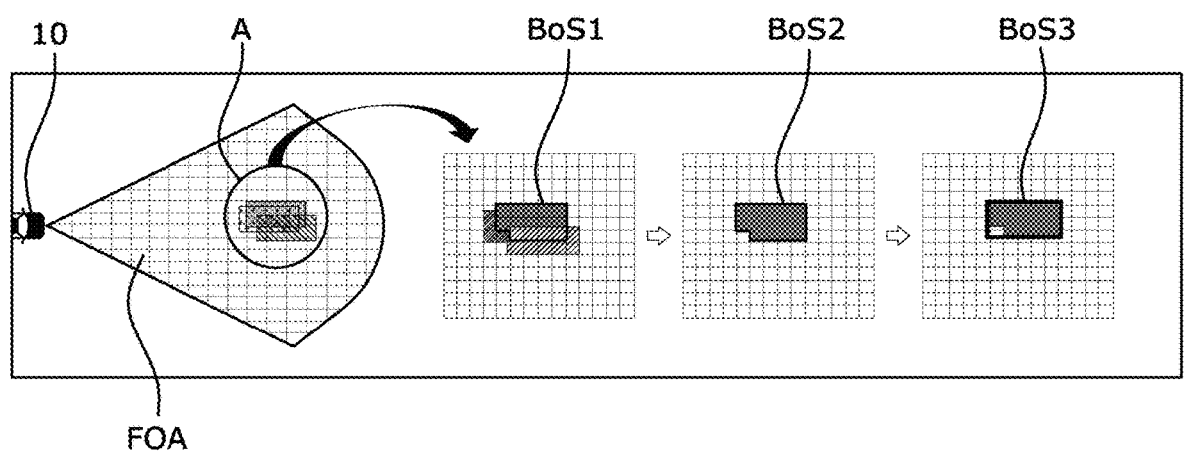
FIG. 7 is a diagram for helping understand step 150A shown in FIG. 6.

FIG. 7 is a diagram for helping understand step 150A shown in FIG. 6. Here, FOA represents the field of view, and reference numeral 10 represents the host vehicle.

After step 140, an area in which the shared sensing track box and the host vehicle sensing track box overlap is formed (step 151). For example, referring to FIG. 7, an area (denoted by "A") BoS1 in which the shared sensing track box and the host vehicle sensing track box overlap may be formed on a grid.

After step 151, the geometrical two-dimensional plane shape of an area BoS2 is converted into a rectangular shape, and the rectangular shape is determined to be a fusion track box of the fusion track information (step 153). Referring to FIG. 7, the geometrical two-dimensional planar shapes BoS1 and BoS2 of the area A are converted into a rectangular shape BoS3, and the rectangular shape BoS3 is determined to be a fusion track box.

Referring again to FIG. 1, after step 150, compensation is performed on additional information of the fusion track information using the shared sensor fusion information and the host vehicle sensor fusion information (step 160). To this end, the additional information compensator 249 compensates for additional information of the fusion track information using the shared sensor fusion information and the host vehicle sensor fusion information and outputs the result of compensation through an output terminal OUT. Here, the additional information may include at least one of the type of the object, the moving direction of the object, or information indicating whether the object is in a moving state or a stationary state, and may be stored in the memory 226. In addition, the memory 226 may store the compensated additional information output through the output terminal OUT.

According to the embodiment, the number of pieces of additional information included in the shared sensor fusion information and the number of pieces of additional information included in the host vehicle sensor fusion information, which are acquired with respect to the same object, may be compared, and compensation may be performed on the additional information of the fusion track information using the larger number of pieces of additional information. For example, when multiple pieces of additional information of the shared sensor fusion information indicate that the type of the object is a vehicle and when one piece of additional information of the host vehicle sensor fusion information indicates that the type of the object is a pedestrian, the additional information of the fusion track information may be compensated for based on the recognition that the type of the object is a vehicle. The reason for this is that the number of pieces of additional information indicating that the type of the object is a vehicle is a plural number, whereas the number of pieces of additional information indicating that the type of the object is a pedestrian is a singular number.

In the sensor information fusion method 100 according to the embodiment, step 160 may be omitted.

Meanwhile, a recording medium in which a program for executing the sensor information fusion method is recorded may store a program for implementing a function of receiving shared sensor fusion information generated by another vehicle and estimating the reliability of the shared sensor fusion information and a function of generating, based on the estimated reliability, fusion track information of an object located near at least one of a host vehicle or the other vehicle using host vehicle sensor fusion information generated by the host vehicle and the shared sensor fusion information. The recording medium may be read by a computer system.

In addition, the computer-readable recording medium may store a program for further implementing at least one of a function of receiving the shared sensor fusion information and converting the shared sensor fusion information to a host vehicle coordinate system, a function of inspecting whether the shared sensor fusion information and the host vehicle sensor fusion information are information about the same object, or a function of compensating for the fusion track information using additional information included in each of the shared sensor fusion information and the host vehicle sensor fusion information.

The computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that the computer-readable code is stored and executed in a distributed fashion. Also, functional programs, code, and code segments for accomplishing the sensor information fusion method 100 can be easily devised by programmers skilled in the art to which the present disclosure pertains.

Hereinafter, sensor information fusion methods according to first and second comparative examples and the sensor information fusion method according to an embodiment will be described with reference to the accompanying drawings.

Figure 8:
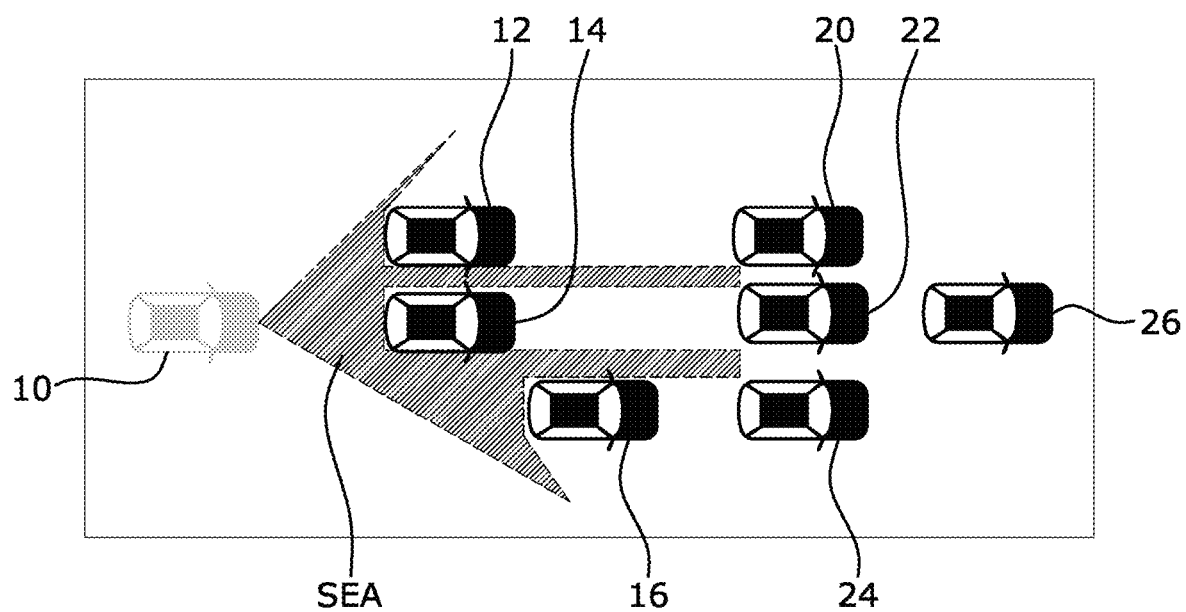
FIG. 8 is a diagram showing a sensor information fusion method according to a first comparative example.

FIG. 8 is a diagram showing a sensor information fusion method according to the first comparative example.

In the case of the sensor information fusion method according to the first comparative example, when an object is to be recognized by different types of sensors mounted in the host vehicle 10, the recognition area is limited to the area that is capable of being detected by the sensors mounted in the host vehicle 10. Therefore, the area that can be recognized by the sensors of the host vehicle 10 is very limited.

For example, referring to FIG. 8, the sensors mounted in the host vehicle 10 are capable of sensing objects 12, 14 and 16 that are not hidden by other objects, but are not capable of sensing objects 20, 22, 24 and 26 that are hidden by the other objects 12, 14 and 16. Therefore, the sensing area SEA of the host vehicle 10 is very limited. In this case, when the preceding vehicles 12, 14 and 16 suddenly stop, it is difficult to maintain a safe distance due to the delay in detection of the vehicles 20, 22, 24 and 26 hidden by the preceding vehicles 12, 14 and 16, thus leading to an accident. Further, when some of the sensors mounted in the host vehicle 10 malfunction, the probability of misrecognition or non-recognition of an object located near the host vehicle 10 increases, and the reliability of information sensed about the object is deteriorated. For example, in the host vehicle 10 equipped with a camera and a radar sensor, when the camera malfunctions, it may be difficult to recognize a pedestrian using only the radar sensor, thus making it impossible to accurately determine the location of the object in the lateral direction.

Figure 9:
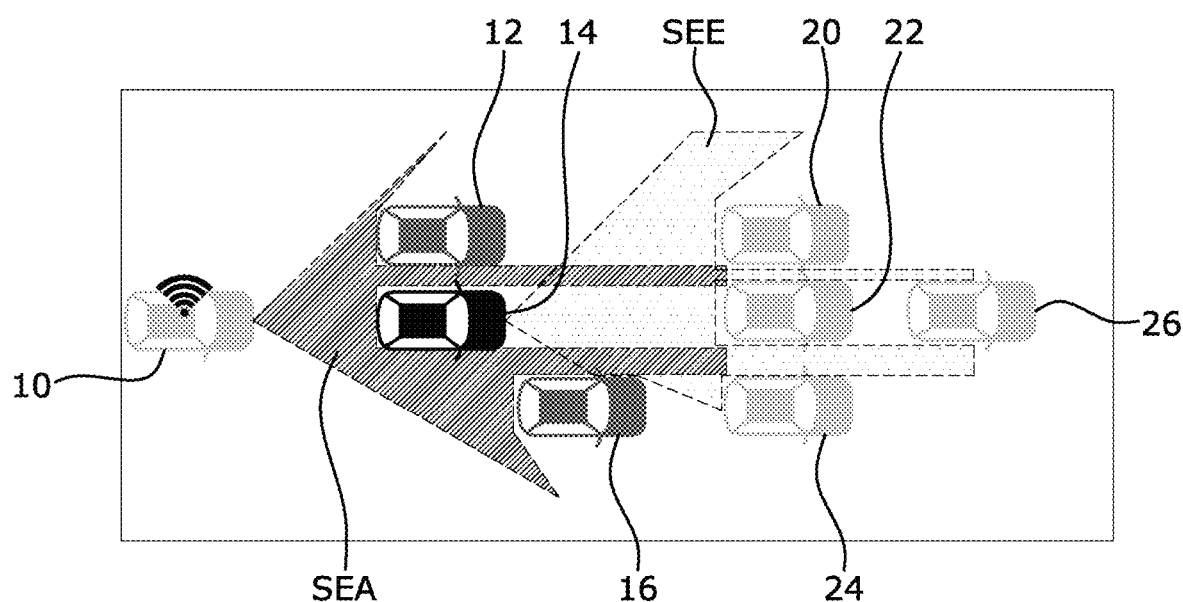
FIG. 9 is a diagram showing a sensor information fusion method according to a second comparative example.

FIG. 9 is a diagram showing a sensor information fusion method according to the second comparative example.

In the case of the second comparative example, because the host vehicle 10 is not capable of recognizing vehicles 20, 22, 24 and 26 hidden by other vehicles 12, 14 and 16, the host vehicle 10 may receive information about the hidden vehicles 20, 22, 24 and 26 from one (e.g. vehicle 14) of the preceding vehicles 12, 14 and 16 (e.g. in sensing area SEE). In this case, however, because the composition of sensors is different for each vehicle and because sensor fusion information is different due to differences in sensor information fusion systems, it is difficult to determine the reliability of the information provided from the vehicle 14 to the host vehicle 10.

Figure 10:
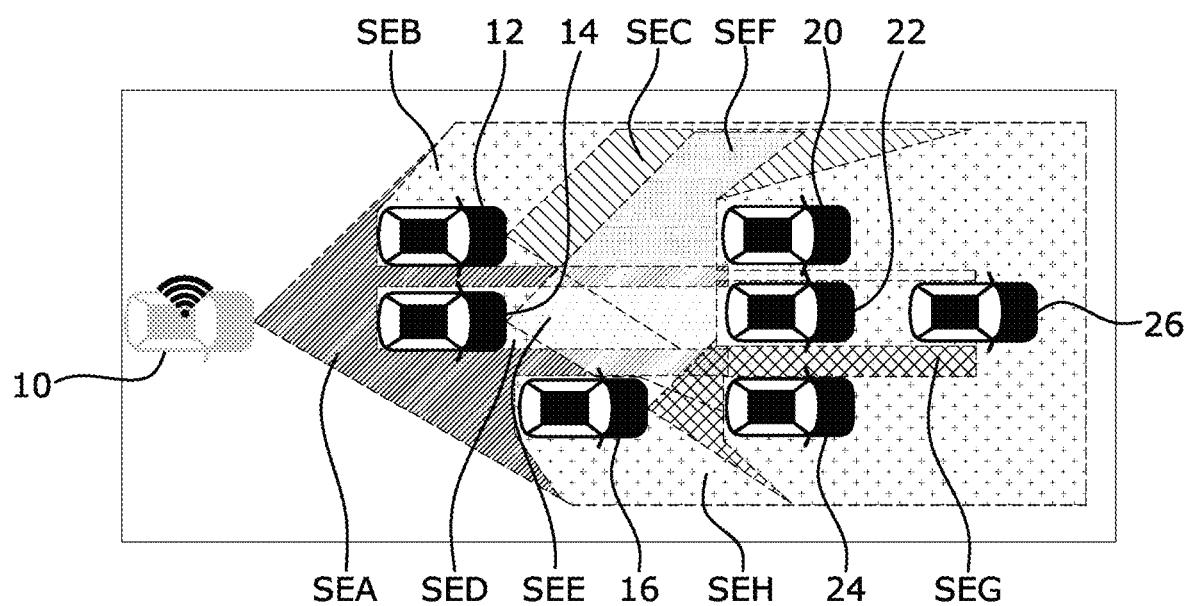
FIG. 10 is a diagram for helping understand a sensor information fusion method according to an embodiment.

FIG. 10 is a diagram for helping understand the sensor information fusion method according to an embodiment.

The host vehicle 10 shown in FIG. 10 corresponds to the host vehicle 10 shown in FIG. 2, and the vehicles 12 to 26 shown in FIG. 10 correspond to the other vehicles 300 shown in FIG. 2.

Depending on the vehicle, the criteria for selecting the reliability of the sensor fusion track information may be different, or the reliability of the sensor fusion track information may not be provided. That is, depending on the vehicle, reliability with respect to a one-dimensional distance (Euclidean) may be provided, or reliability with respect to a two-dimensional location may be output. Further, units indicating reliability and the degree of accuracy may be different. That is, one of pieces of shared sensor fusion information may indicate reliability within a range of 0 to 10, and another one of pieces of shared sensor fusion information may indicate reliability within a range of 0 to 100.

Therefore, considering this, in the case of the embodiment, even if the senor fusion information of the host vehicle and the sensor fusion information of the other vehicle have different forms, the reliability of the shared sensor fusion information is estimated using information that is necessarily included in the sensor fusion information, i.e. at least one of the duration, the confidence value, the similarity of the absolute speed, or the order number of selections as the candidate described above, and the shared sensor fusion information and the host vehicle sensor fusion information are fused based on the estimated reliability, whereby it is possible to improve the reliability of the generated fusion track information.

The host vehicle 10 shown in FIG. 10 is capable not only of sensing the area SEA that is not hidden by the other vehicles 12, 14 and 16 but also of recognizing information about the areas SEB to SEH that are hidden by the other vehicles 12, 14 and 16. That is, the host vehicle 10 may receive shared sensor fusion information about the areas SEB, SEC and SEF, which are sensed by the other vehicle 12, from the other vehicle 12, may receive shared sensor fusion information about the areas SED, SEE and SEF, which are sensed by the other vehicle 14, from the other vehicle 14, may receive shared sensor fusion information about the areas SEG and SEH, which are sensed by the other vehicle 16, from the other vehicle 16, and may fuse the received shared sensor fusion information with the host vehicle sensor fusion information. Accordingly, as shown in FIG. 10, it is possible to recognize the areas SEB to SEH, which are hidden by the other vehicles 12, 14 and 16 and thus are not capable of being recognized by the comparative examples.

In addition, even if the sensor mounted in the host vehicle 10 malfunctions, it is possible to prevent deterioration in the performance of estimation of surrounding objects and to recognize objects around the host vehicle with the help of other vehicles, thereby enabling the number of sensors mounted in the host vehicle 10 to be reduced.

As is apparent from the above description, according to the method and apparatus for fusing sensor information and the recording medium storing a program to execute the method according to the embodiments, it is possible to improve the reliability of generated fusion track information by fusing shared sensor fusion information generated by a neighboring vehicle and host vehicle sensor fusion information generated by the host vehicle and to recognize not only an area that is not hidden by the neighboring vehicle but also an area that is hidden by the neighboring vehicle and thus is not capable of being recognized by the related art. In addition, even if the sensor mounted in the host vehicle malfunctions, it is possible to prevent deterioration in the performance of estimation of surrounding objects and to recognize objects around the host vehicle with the help of neighboring vehicles, thereby enabling the number of sensors mounted in the host vehicle to be reduced.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A sensor information fusion method comprising:
   estimating, by a host vehicle, reliability of shared sensor fusion information received from a neighboring vehicle, the shared sensor fusion information being generated by the neighboring vehicle; and
   generating, based on the estimated reliability, fusion track information of an object located near the host vehicle or the neighboring vehicle using host vehicle sensor fusion information generated by the host vehicle and the shared sensor fusion information.

2. The method according to claim 1, further comprising converting the shared sensor fusion information to a host vehicle coordinate system.

3. The method according to claim 2, wherein converting the shared sensor fusion information comprises:
   calculating a relative location and a relative speed of the neighboring vehicle with respect to the host vehicle; and
   converting a reference location of the shared sensor fusion information into a reference location of the host vehicle using the relative location and the relative speed.

4. The method according to claim 1, further comprising inspecting whether the shared sensor fusion information and the host vehicle sensor fusion information are information about an identical object.

5. The method according to claim 4, wherein estimating the reliability of the shared sensor fusion information is performed when the shared sensor fusion information and the host vehicle sensor fusion information are information about the identical object.

6. The method according to claim 4, wherein inspecting comprises selecting the shared sensor fusion information as a primary candidate having information about the identical object as the host vehicle sensor fusion information when a shared sensing track box belonging to the shared sensor fusion information and a host vehicle sensing track box belonging to the host vehicle sensor fusion information overlap each other.

7. The method according to claim 6, wherein inspecting further comprises selecting a secondary candidate of the shared sensor fusion information having information about the identical object as the host vehicle sensor fusion information using speed information included in the shared sensor fusion information selected as the primary candidate and speed information included in the host vehicle sensor fusion information.

8. The method according to claim 7, wherein inspecting further comprises selecting a tertiary candidate of the shared sensor fusion information having information about the identical object as the host vehicle sensor fusion information using similarity between a movement path history of an object sensed by the neighboring vehicle and included in the shared sensor fusion information selected as the primary candidate and a movement path history of an object sensed by the host vehicle and included in the host vehicle sensor fusion information.

9. The method according to claim 8, wherein estimating the reliability is performed using first information included in the shared sensor fusion information or second information generated using the shared sensor fusion information.

10. The method according to claim 8, wherein estimating the reliability comprises:
   obtaining a duration of a track included in the shared sensor fusion information;
   obtaining a confidence value corresponding to a location of the object sensed by the neighboring vehicle or a combination of sensors mounted in the neighboring vehicle using the shared sensor fusion information;
   obtaining similarity of absolute speed between the host vehicle sensor fusion information and the shared sensor fusion information;
   checking an order number of selections of the shared sensor fusion information as the primary candidate, the secondary candidate, and the tertiary candidate; and
   calculating the estimated reliability using the duration, the confidence value, the similarity of the absolute speed, or the order number of the selections.

11. The method according to claim 10, wherein, when the shared sensor fusion information is not selected as any one of the primary candidate, the secondary candidate, and the tertiary candidate, a default is assigned to the reliability.

12. The method according to claim 6, wherein generating the fusion track information comprises:
   forming an area in which the shared sensing track box and the host vehicle sensing track box overlap; and
   converting a geometrical two-dimensional plane shape of the area into a rectangular shape and determining the rectangular shape to be a fusion track box of the fusion track information.

13. The method according to claim 1, further comprising compensating for additional information of the fusion track information using the shared sensor fusion information and the host vehicle sensor fusion information.

14. The method according to claim 13, wherein the additional information comprises:
   a type of the object;
   a moving direction of the object; or
   information indicating whether the object is in a moving state or a stationary state.

15. A sensor information fusion apparatus, the apparatus comprising:
   a processor; and
   memory storing software instructions that, when executed by the processor, cause the sensor information fusion apparatus to:
      receive shared sensor fusion information generated by a neighboring vehicle and to estimate reliability of the shared sensor fusion information; and
      generate, based on the estimated reliability, fusion track information of an object located near a host vehicle or the neighboring vehicle using host vehicle sensor fusion information generated by the host vehicle and the shared sensor fusion information.

16. The apparatus according to claim 15, wherein the software instructions further cause the sensor information fusion apparatus to:
   communicate with the neighboring vehicle and to receive the shared sensor fusion information; and
   convert the shared sensor fusion information to a host vehicle coordinate system.

17. The apparatus according to claim 16, wherein the software instructions further cause the sensor information fusion apparatus to inspect whether the shared sensor fusion information converted to the host vehicle coordinate system and the host vehicle sensor fusion information are information about an identical object.

18. The apparatus according to claim 15, wherein the software instructions further cause the sensor information fusion apparatus to compensate for additional information of the fusion track information using the shared sensor fusion information and the host vehicle sensor fusion information.

19. A non-transitory computer-readable recording medium in which a program for executing a sensor information fusion method is recorded, the computer-readable recording medium storing a program to implement:
   a function of receiving shared sensor fusion information generated by a neighboring vehicle and estimating reliability of the shared sensor fusion information; and
   a function of generating, based on the estimated reliability, fusion track information of an object located near a host vehicle or the neighboring vehicle using host vehicle sensor fusion information generated by the host vehicle and the shared sensor fusion information.

20. The non-transitory computer-readable recording medium according to claim 19, wherein the program further implements at least one of:
   a function of receiving the shared sensor fusion information and converting the shared sensor fusion information to a host vehicle coordinate system;
   a function of inspecting whether the shared sensor fusion information and the host vehicle sensor fusion information are information about an identical object; or
   a function of compensating for the fusion track information using additional information included in each of the shared sensor fusion information and the host vehicle sensor fusion information.

* * * * *